United States Patent [19]
Nelson

[11] Patent Number: 5,613,919
[45] Date of Patent: Mar. 25, 1997

[54] ZERO VELOCITY GEAR MESH DIFFERENTIAL

[76] Inventor: Bertel S. Nelson, 5615 Castelwood Ct., Rockford, Ill. 60118

[21] Appl. No.: 467,858

[22] Filed: Jun. 6, 1995

[51] Int. Cl.⁶ ........................................................ F16H 3/72
[52] U.S. Cl. .............................. 475/7; 475/330; 475/339
[58] Field of Search .............................. 475/3, 4, 7, 329, 475/330, 339, 349, 317, 248; 74/412 R, 413

[56] References Cited

U.S. PATENT DOCUMENTS

| | | | |
|---|---|---|---|
| 4,191,070 | 3/1980 | McKinniss | 475/317 |
| 5,167,594 | 12/1992 | Egan | 475/349 |
| 5,201,690 | 4/1993 | Dooner et al. | 475/7 |

*Primary Examiner*—Charles A. Marmor
*Assistant Examiner*—Sherry Lynn Estremsky
*Attorney, Agent, or Firm*—Robert M. Wolters

[57] ABSTRACT

A zero velocity gear mesh differential is disclosed. A power input shaft and a power output shaft are colinear and tend to rotate at the same speed. Power gears effect the transfer of power. In addition, there are speed control gears including a planetary system having a control carrier and a sun gear. A plurality of planet gears engage said sun gear and also engage an internal ring gear integral with an external worm gear and which is supported by the control carrier and planet gears. The external worm gear is engaged by a worm which is rotatable. A fixed gear on the control carrier engages a fixed gear on the main carrier.

9 Claims, 1 Drawing Sheet

ZERO VELOCITY GEAR MESH DIFFERENTIAL

BACKGROUND OF THE INVENTION

In various manufacturing operations a power source, such as an electric motor has a drive shaft which in turn drives an apparatus at a fixed speed. It will be understood that this speed could be changed by changing the speed of the motor, or by a speed changing gearbox or the like between the motor and the shaft. However, by way of a specific example, it is often desired to have the speed of the driven apparatus remain constant. Nevertheless, it may be desirable from time to time to have the phase of the driven apparatus differ from the phase of the driving motor (or the gearbox from the driving motor).

OBJECTS AND SUMMARY OF THE PRESENT INVENTION

It is the principal object of the present invention to provide power gearing which handles high loads with no relative motion occurring between the gear teeth for the majority of the time.

An ancillary object of the present invention is to provide such a power gearing with the only time relative motion occurs between the gears is when a phase adjustment or "trimming" operation is required, and at that time the relative speed of the power gears are very low.

It is a well known fact that gearing can handle much higher loads at low speed than at high mesh velocities. Hence for the same gear design and metallurgies I can transmit more horsepower in a given length and width of unit, or conversely provide a longer wear life in the same length and width.

The control gearing in the present gear set is running at high pitch line velocity, but this gearing is subjected to only a fraction (depending on detailed gear design), but typically only 1/20 of the torque flowing through the power gearing. Both the power gearing and control side gearing operate on parallel shafts and can be spur or preferably helical gearing whereas most competitive units use spur gearing.

Furthermore, the present design provides capability for a wide variety of control ratios wherein control ratio is defined as the number of turns of the control shaft to effect one complete rotation (360°) of the output shaft with respect to the input shaft. The control shaft can be adjusted while the unit is operating or when it is stationary. This adjustment is normally done manually, or by using stepper or servo control motors.

The design provides a popular one-to-one ratio, same direction of rotation unit, and with potential for a wide variety of control ratios. Either shaft can be the input or the output shaft.

THE DRAWINGS

The present invention will be best understood with reference to the following drawings when taken in connection with the ensuing specification, wherein.

DETAILED DISCLOSURE OF THE ILLUSTRATED EMBODIMENTS

Figure 1:
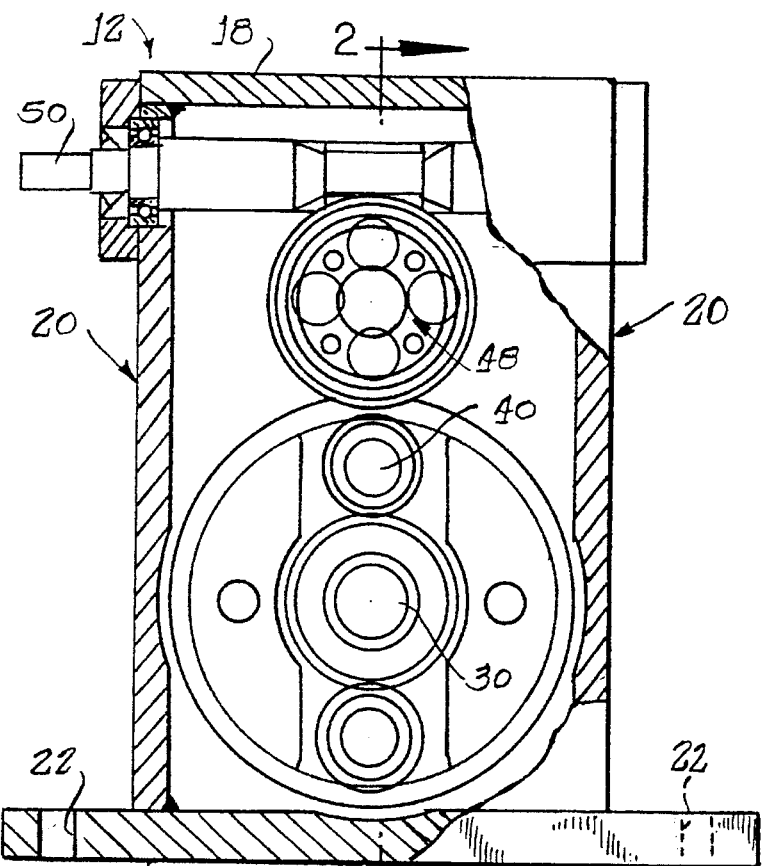
FIG. 1 is a vertical section.
Figure 2:
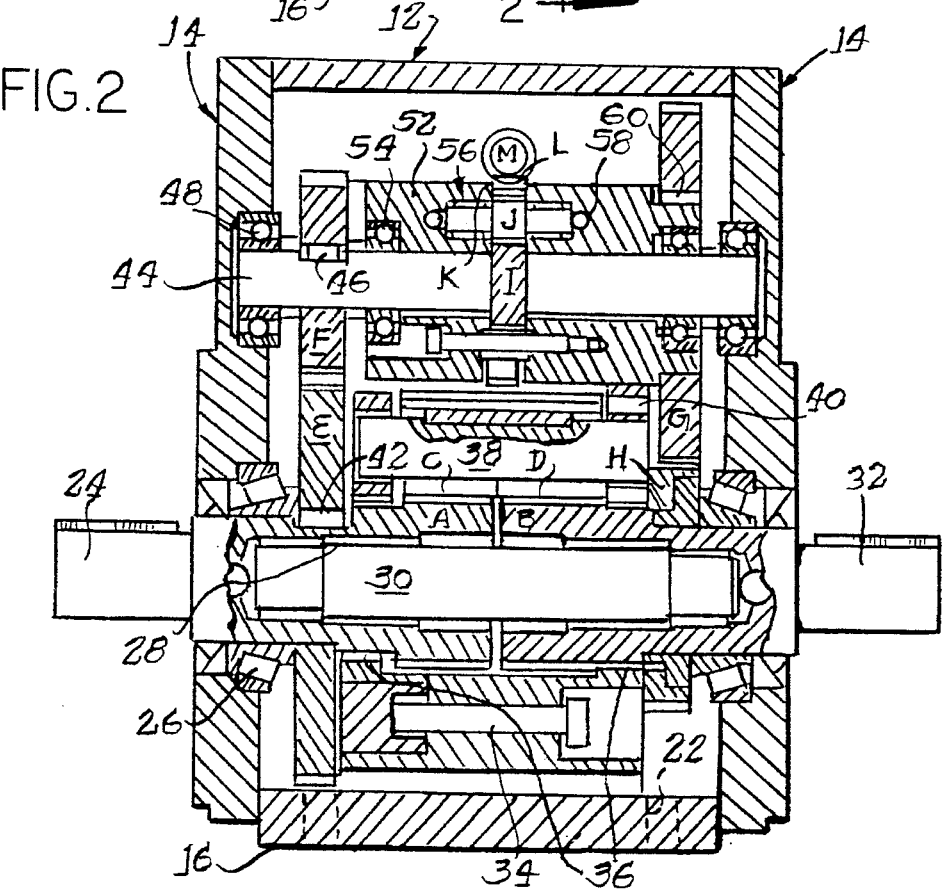
FIG. 2 is a cross sectional view taken substantilly through the central shaft axes plane of differential gearing as constructed in accordance with the present invention, taken along the line 2—2 in FIG. 1.

The entire gear set o the present invention is housed in a housing generally designated by the numeral 12. The housing includes front and back walls 14, connecting bottom 16 and top 18 walls, and side walls 20. The bottom wall is provided with bolt holes 22 in a rectangular array so that the gear may be secured in operating position.

The shaft at the left end is considered to be the input shaft, although the operation can be reversed if desired. The input shaft 24 is supported by Timken bearing 26, and a sleeve or a needle bearing 28 on backbone 30. This so called "backbone" method support is covered by U.S. Pat. No. 4,832,659 of which I am the inventor.

A power gear A is integral with the input shaft. Power gear B is integral with the output shaft 32, and the shafts and gears are coaxial. The bearing support of the output shaft is comparable to that of the input shaft. The Timken bearings are supported in the end walls which are dowelled and bolted to the main central housing. Shims are used to set the Timken bearings to proper preload. Shaft oil seals prevent leakage.

A two-piece carrier 34 is dowelled and bolted together and is supported on sleeve bearings 36 operating on the input and output shafts. In turn, the carrier supports one or more idler gear assemblies consisting of power gears C and D which are keyed to a shaft 38 which is supported on radial bearings 40.

Control gear E is keyed to and supported by the input shaft 24 by key 42. It mates with gear F keyed to a cross shaft 44 by key 46. The cross shaft 44 is supported by bearings 48 in the side walls and further is integral with control sun pinion I. This sun pinion mates with control planet pinion J of which there are four shown, which in turn mates with (and supports) internal gear K.

This internal gear is provided with a worm gear L cut on an outer periphery. The worm gear L, mates with a worm M (shown as a cylindrical worm) which is integral with control shaft 50, A two-piece control carrier 52 which is dowelled and bolted together is supported by bearings 54, and in turn supports the planet pinions J on needle bearings 56 and thrust balls 58. Gear G is press fitted and keyed by a key 60 to the control carrier 52 and meshes with gear H which is bolted to the main carrier 34.

In a typical design the control gearing is chosen to have a one-to-one ratio and the same direction of rotation between the input shaft 24 and the main carrier 34. It follows that the output shaft 32 must also rotate in a one-to-one relationship with the input shaft. Hence, no mesh action occurs when the control shaft 44 is not rotating. In other words, there is zero mesh velocity at this time.

In a typical design, control gears E and G would each have 75 teeth; control gears F and H have 45 teeth; sun pinion I has 36 teeth; planet gears; J each have 14 teeth; and the internal gear K has 46 teeth. Thus, if the input shaft is running at 100 RPM clockwise the cross shaft/44 will run at 100×75/45 or 166.67 RPM counterclockwise. The control carrier/52 would then be at 166,67/(1 +64/36), or 60 RPM counterclockwise, and the main power carrier would rotate at 60×75/45, or 100 RPM clockwise. This is the same speed and direction as the input shaft. Therefore the entire power gear train A,B,C,D and supporting carrier 34 are rotating at 100 RPM clockwise around the input and output shaft axes without relative motion between the power gear teeth.

An innumerable set of main power gears have application to this design as the following three examples will illustrate:

| Gear | Number of Teeth in Gear | | |
|---|---|---|---|
| | Set 1 | Set 2 | Set 3 |
| A | 42 | 40 | 63 |
| B | 40 | 44 | 58 |
| C | 24 | 24 | 38 |
| D | 24 | 27 | 35 |
| Ratio | 20.000 | 44.000 | 2204.000 |

The ratio shown here is the number of turns of the main carrier relative to the input shaft that will effect a 360° (one turn) rotation of the output shaft relative to the input shaft. By analysis of gear set B assume we hold the carrier stationary and rotate gear A 100 revolutions in a clockwise direction. This will rotate gear B clockwise through 100×40/24×27/44=102.272727 revolutions. Now lock all gear teeth positions and rotate the entire assembly by 100 revolutions counterclockwise. Then gear A will be returned to its original position and gear B will have rotated 102.272727-100.0, or 2.272727 revolutions clockwise. Thus the ratio from carrier to gear B ( relative gear A) is 100.0/2.272727 or 44.000 to 1, in opposing direction.

With the control gearing indicated above, 100 revolutions clockwise of the control worm gear L (integral with the internal gear K) will rotate the contact carrier 52 exactly 100×(1+64/36)/(64/36) or 156.25 revolutions and in the same clockwise direction. This will cause the main carrier 34 to rotate 156.25×75/45, or 260.416667 turns, in a counterclockwise direction, or a step-up ratio of 2.604167 to 1.

The worm and gear set can also have a great variety of tooth combinations. If we choose a 50 tooth worm gear, at a two thread worm, we have a reduction ratio of 50/2 or 25:1. In combining the main carrier ratio, the step up ratio of 2.604, and the worm gear ratio we have overall control ratios of 192.000, 422,400, and 21,158. 400:1 respectively for main gearing sets as set forth above, under set 1, set 2, and set 3. The torque to be handled by the control gearing at the input shaft and at the main carrier are 1/20, 1/24 and 1/2204 of the main power flow torque, respectively.

These torque calculations neglect the influence of mechanical efficiencies of the power gearing A,B,C and D, but these are expected to be in excess of 90 percent and do not have an important bearing.

It will further be recognized by gear engineers that the wide variety of gear numbers chosen are compatible with power gears A and C operating on the same gear center distance as do gears B and D. This is simply a matter of selecting suitable pitch (size of teeth), helix angles, and gear diameter modifications.

A modification of the design may be made if the main power sets A and C along with gears B and D are made sightly smaller, and the main carrier 34 enlarged slightly, then these gear sets can be completely shrouded and a smooth carrier exterior presented to the oil bath for minimum heating due to oil shear. Further, suitable drilled openings in the side walls and outer diameter of the main carrier can be provided to set up a centrifugally induced oil circulation to the power gears.

A small motor (not shown) can be used to control the control shaft 50. In fact, this shaft could even be manually operated since it is not commonly operated except to adjust the phase.

It now will be apparent that I have shown a zero velocity gear mesh differential. There is no relative motion occurring between the gear teeth for controlling the phase of the main gearing. This means that the gearing can handle much higher loads at the low speed than gearing can at high speeds. With the same gear design and metallurgies I can transmit more horsepower in a given length and width of unit, or conversely provide a longer wear life in the same length and width. The control unit is running at high pitch line velocity, but this gearing is subjected to only a fraction, typically 1/20th, of the torque flowing through the power gearing.

Various changes in design may occur to those skilled in the art, and these changes in design will be understood as coming within the amit of the present invention insofar as they fall within the spirit and :scope of the appended claims.

The invention is claimed as follows:

1. A zero velocity gear mesh differential, comprising a driven power input shaft, a pair of meshing power input gears driven by said power input shaft, a power output shaft, a pair of meshing power driven gears driven from said power input gears, said power output shaft tending to turn at the speed of said input shaft, a pair of control gears driven by said input shaft, the second of said control gears being fixed on a control shaft and rotating therewith, a sun gear fixed on said control shaft, a carrier, at least one planet gear carried by said carrier and meshing with said sun gear, an internal gear supported on said planet gear, a worm gear on said internal gear, a worm controlling said worm gear, a gear fixed to said carrier, a main carrier carrying at least one of said power input gears and one of said power driven gears and rotatable about the first of said power driven gears and the first of said power input gear, and a gear fixed to said main carrier and meshing with first said gear fixed to said carrier.

2. A gear mesh differential as set forth in claim 1 wherein said planet gear is meshed with the internal gear.

3. A gear mesh differential as set forth in claim 1 including a plurality of planet gears meshing with said sun gear and with said internal gear.

4. A gear mesh differential as set forth in claim 2 including a plurality of planet gears meshing with said sun gear and with said internal gear.

5. A gear mesh differential as set forth in claim 1 and further including means for controlling the worm gear.

6. A gear mesh differential as set forth in claim 1 wherein the one of said power driven gears and the one of said power input gears carried by said main carrier are supported to rotate with said carrier.

7. A gear mesh differential as set forth in claim 1 wherein the first of said driving gears and the first of said driven gears are coaxial.

8. A gear mesh differential as set forth in claim 1 wherein said input and said driven gears and said main carrier are shrouded.

9. A gear mesh differential as set forth in claim 8 wherein there are holes in the side walls and in the outside diameter of the shroud.

* * * * *